(12) United States Patent
Peters et al.

(10) Patent No.: US 10,811,004 B2
(45) Date of Patent: Oct. 20, 2020

(54) AUTO-GENERATION OF PARSING GRAMMARS FROM A CONCEPT ONTOLOGY

(71) Applicant: Nuance Communications, Inc., Burlington, MA (US)

(72) Inventors: Stephen Douglas Peters, Pointe-Claire (CA); Réal Tremblay, Outremont (CA)

(73) Assignee: Nuance Communications, Inc., Burlington, MA (US)

( * ) Notice: Subject to any disclaimer, the term of this patent is extended or adjusted under 35 U.S.C. 154(b) by 124 days.

(21) Appl. No.: 13/852,165

(22) Filed: Mar. 28, 2013

(65) Prior Publication Data

US 2014/0297282 A1 Oct. 2, 2014

(51) Int. Cl.
*G10L 15/00* (2013.01)
*G10L 15/19* (2013.01)
*G10L 15/18* (2013.01)

(52) U.S. Cl.
CPC .......... *G10L 15/19* (2013.01); *G10L 15/1815* (2013.01)

(58) Field of Classification Search
CPC ....................................................... G10L 15/00
USPC ............ 704/254, 9, 275, 270.1, 257, 244, 2; 3/254; 700/49; 379/52
See application file for complete search history.

(56) References Cited

U.S. PATENT DOCUMENTS

| | | | | |
|---|---|---|---|---|
| 7,194,069 B1 * | 3/2007 | Jones | ..................... | H04M 3/493 379/210.01 |
| 7,340,460 B1 * | 3/2008 | Kapur | ..................... | G06F 16/955 |
| 7,865,357 B2 * | 1/2011 | Acero | ................... | G10L 15/197 704/1 |
| 8,140,335 B2 * | 3/2012 | Kennewick | ........ | G06Q 30/0261 704/257 |
| 8,315,849 B1 * | 11/2012 | Gattani | ................. | G06F 16/353 704/2 |
| 8,374,871 B2 * | 2/2013 | Ehsani | .................. | G10L 15/005 704/257 |
| 2002/0091528 A1 * | 7/2002 | Daragosh | ................ | G10L 15/30 704/270.1 |
| 2003/0050772 A1 * | 3/2003 | Bennett | ................. | G06F 40/253 704/9 |
| 2003/0120494 A1 * | 6/2003 | Jost | ......................... | G10L 15/22 704/275 |
| 2004/0030421 A1 * | 2/2004 | Haley | .................... | G06Q 10/10 700/49 |
| 2005/0122435 A1 * | 6/2005 | Yunoki | .................. | H04N 5/782 348/725 |
| 2006/0293894 A1 * | 12/2006 | Peyroux | ................ | G10L 15/183 704/257 |
| 2007/0239454 A1 * | 10/2007 | Paek | ....................... | G10L 15/19 704/257 |
| 2007/0288239 A1 * | 12/2007 | Russell | ................ | G10L 15/193 704/257 |

(Continued)

*Primary Examiner* — Michael Colucci
(74) *Attorney, Agent, or Firm* — Brian J. Colandreo; Michael T. Abramson; Holland & Knight LLP

(57) ABSTRACT

An ontology stores information about a domain of an automatic speech recognition (ASR) application program. The ontology is augmented with information that enables subsequent automatic generation of a speech understanding grammar for use by the ASR application program. The information includes hints about how a human might talk about objects in the domain, such as preludes (phrases that introduce an identification of the object) and postludes (phrases that follow an identification of the object).

21 Claims, 9 Drawing Sheets

(56) References Cited

U.S. PATENT DOCUMENTS

| | | | |
|---|---|---|---|
| 2010/0023329 A1* | 1/2010 | Onishi | G10L 15/07 704/244 |
| 2010/0208873 A1* | 8/2010 | Chambers | H04M 3/493 379/52 |
| 2011/0055256 A1* | 3/2011 | Phillips | G10L 15/30 707/769 |
| 2013/0179152 A1* | 7/2013 | Votintseva | G06F 9/453 704/9 |

* cited by examiner

```
<rule id="BillManagement"><one-of>                                                    ⎫
                                                                                      ⎬ 704
<item><!--DDPrelude1--><ruleref uri="#DueDate"><tag>...</tag><!--DDPostlude1--></item> ⎪
<item><!--DDPrelude2--><ruleref uri="#DueDate"><tag>...</tag><!--DDPostlude2--></item> ⎪
<item><!--DDPrelude3--><ruleref uri="#DueDate"><tag>...</tag><!--DDPostlude3--></item> ⎭
...
                                                                                              ⎫
<item><!--BPrelude1--><ruleref uri="#Balance"><tag>...</tag><!--BPostlude1--></item>          ⎬ 706
<item><!--BPrelude2--><ruleref uri="#Balance"><tag>...</tag><!--BPostlude2--></item>          ⎪
<item><!--BPrelude3--><ruleref uri="#Balance"><tag>...</tag><!--BPostlude3--></item>          ⎭
...
                                                                                                      ⎫
<item><!--VFPrelude1--><ruleref uri="#VerifyFunds"><tag>...</tag><!--VFPostlude1--></item>            ⎬ 708
<item><!--VFPrelude2--><ruleref uri="#VerifyFunds"><tag>...</tag><!--VFPostlude2--></item>            ⎪
<item><!--VFPrelude3--><ruleref uri="#VerifyFunds"><tag>...</tag><!--VFPostlude3--></item>            ⎭
...
                                                                                              ⎫
<item><!--ODPrelude1--><ruleref uri="#OverDue"><tag>...</tag><!--ODPostlude1--></item>        ⎬ 710
<item><!--ODPrelude2--><ruleref uri="#OverDue"><tag>...</tag><!--ODPostlude2--></item>        ⎪
<item><!--ODPrelude3--><ruleref uri="#OverDue"><tag>...</tag><!--ODPostlude3--></item>        ⎭
...
                                                                                              ⎫
<item><!--PBPrelude1--><ruleref uri="#PayBill"><tag>...</tag><!--PBPostlude1--></item>        ⎬ 712
<item><!--PBPrelude2--><ruleref uri="#PayBill"><tag>...</tag><!--PBPostlude2--></item>        ⎪
<item><!--PBPrelude3--><ruleref uri="#PayBill"><tag>...</tag><!--PBPostlude3--></item>        ⎭
...

</one-of></rule>
```

FIG. 7

```
<rule id="DueDate"><one-of>

<item><!--PPrelude1 --><ruleref uri="#PAYEE"><tag>...</tag><!--PPostlude1--></item>
    <item><!--PPrelude2 --><ruleref uri="#PAYEE"><tag>...</tag><!--PPostlude2--></item>
    ...
</one-of></rule>
```

FIG. 8

AUTO-GENERATION OF PARSING GRAMMARS FROM A CONCEPT ONTOLOGY

TECHNICAL FIELD

The present invention relates to automatic speech recognition and, more particularly, to automatic generation of grammars for automatic speech recognition from ontologies.

BACKGROUND ART

Automatic speech recognition (ASR) technology enables human users to interact with automated systems by uttering commands or responses to prompts. ASR technology is used in many types of systems, such as telephone banking, text dictation, automobile control (such as to adjust car radio volume or open or close a power window) and military aircraft control.

A typical speech-enabled system processes user utterances in several stages. First, a speech recognizer attempts to recognize individual words in the utterance or statistically possible words in the utterance. That is, the speech recognizer converts an audio input into a string of words or possible words. Then, a language understanding module attempts to interpret the recognized words or possible words to ascertain a meaning of the utterance. The interpreted words are then passed to application code, which implements business or control logic to cause a transfer of funds, control a device, etc., according to the inferred meaning of the utterance.

A well-designed speech user interface is important to the success of a speech-enabled system. Two basic approaches are available for constructing a speech user interface. A "directed dialog" prompts a user to say a specific phrase or one of several (typically a small number of) specific phrases. A directed dialog system is rigid, in that it can recognize only utterances that are represented in a predefined grammar. Thus, a developer of the grammar must predict or specify all the utterances that are to be recognizable.

On the other hand, a "natural language" user interface enables the user to speak more or less naturally. A natural language system utilizes a statistical "language model" to initially recognize the words or likely words that were uttered, based on probabilities, such as the probability that an utterance is a given word, based on one or more previously recognized words. Some language models are topic domain-specific, such as medical radiology or aircraft control. A language model is often built by analyzing a large set of representative sentences, phrases or the like, to obtain statistics about word occurrence frequency, which words tend to occur after other words or phrases, etc.

Natural language recognition is typically preferred when all possible utterances cannot be predicted, such as in a text dictation system or a speech-controlled system with many commands and options that is to be used by a wide variety of untrained people. In contrast, directed dialog systems may provide better recognition accuracy or system performance (i.e., speed, memory requirements, etc.) in relatively small, well-defined topic domains, such as automated telephone attendants.

Once words of an utterance have been recognized, both directed dialog systems and natural language systems use grammars to interpret the meanings of recognized words. In the context of interpreting the meanings of recognized words, a grammar is a set of phrases that a system is prepared to recognize. Conceptually, the phrases in a grammar represent all legitimate utterances a user may make. If a user utterance is included in the grammar, the system recognizes words of the utterance. If the user utters something that is not in the grammar, the utterance may be considered ungrammatical ("out-of-grammar"), and the system may not recognize the utterance correctly.

However, typically there are many ways a human can express a particular idea or command. For example, a user may order "two large pizzas, one with olives and the other with anchovies," or the user may say she wants "one olive pizza and one anchovy pizza, both large." Both utterances have the same meaning. Thus, a grammar writer's task involves predicting a set of phrases and encoding the phrases in the grammar. However, due to the variety of ways ideas and commands can be expressed, a grammar that accommodates a reasonable range of expressions can be quite large and difficult to design. Furthermore, the complexity of a grammar greatly affects speed and accuracy of an ASR system. Thus, complex grammars should be constructed with as much care as complex software programs.

Grammar writing is, however, an unfamiliar task for most software developers, and creating a high-quality, error-free grammar requires somewhat different skills than programming in a language, such as Java or C++. For example, grammars are inherently non-procedural. Thus, many typical software development approaches are not applicable to grammar development.

In a speech-enabled application, "slots" are sometimes used to hold individual pieces of information from a recognized utterance. For example, in an automated banking system, slots may be defined for: (1) "command-type" (examples of which include "deposit," "withdrawal," "bill-payment" and the like); (2) "source-account" ("checking," "savings" or "money-market"); and (3) "amount." An ASR system fills these slots with logical representations of recognized words and then passes the slots to application code for processing. For example, the phrases "the first of March" and "March the first" may cause a slot labeled "DATE" to be filled with "Mar01" or some other unambiguous date representation.

In a "conventional grammar" (typically used for directed dialogs), every recognized phrase potentially corresponds to a slot and, as noted, if a user utters an out-of-grammar phrase, the utterance is not recognized correctly. Thus, conventional grammars are difficult to write, because typically many ways to express an idea or command must be included in the grammar.

To provide more flexibility, "robust grammars" (typically used for natural language systems) allow "wildcards" to absorb (ignore) uttered words that do not correspond to any slot. For example, a robust grammar for recognizing a beverage order that includes a quantity and a flavor (ex., "three root beers") may ignore filler phrases between the quantity and the flavor (ex. "three, uh, root beers" or "three A&W root beers"). However, these wildcards can cause unintended negative consequences. For example, such a grammar might misrecognize "two pizzas and a root beer" as an order for two root beers. In other words, the grammar might mistakenly ignore an important portion (i.e., "pizzas and a") of the utterance.

SUMMARY OF EMBODIMENTS

An embodiment of the present invention provides a computerized ontology. The ontology facilitates automatically generating a speech understanding grammar for an automatic speech recognition (ASR) application program.

The ontology includes a computerized database containing information about a plurality of hierarchically organized concepts related to a domain of the ASR application program. For each of at least a subset of the plurality of concepts, the ontology also includes information associated with the concept. The information includes at least one hint about how a human speaker might refer to the concept in an utterance.

The at least one hint may include a prelude and a postlude.

Another embodiment of the present invention provides a computer-implemented method for automatically generating a speech understanding grammar for an automatic speech recognition (ASR) application program. The method includes performing operations by a processor. The operations include accessing a computerized ontology. The ontology contains information about a plurality of hierarchically organized concepts related to a domain of the ASR application program. For each concept of at least a subset of the plurality of concepts, the ontology includes at least one associated hint about how a human speaker might refer to the concept in an utterance. At least one user command is accepted via a user interface. The at least one user command identifies a user-selected subset of the plurality of concepts. At least one hint is associated with each concept of the user-selected subset of the plurality of concepts. The at least one hint is retrieved from the ontology. A speech understanding grammar is generated from the retrieved at least one hint.

For at least one concept of the user-selected subset of the plurality of concepts, a second concept may be identified. The second concept may be at a lower hierarchical level than the at least one concept. At least one second hint may be retrieved from the ontology. The at least one second hint may be associated with the second concept. Generating the speech understanding grammar from the retrieved at least one hint may include generating a speech understanding grammar from the retrieved at least one second hint.

The at least one hint may include a prelude and a postlude.

Yet another embodiment of the present invention provides a method for constructing a database. The database may facilitate subsequently automatically generating a speech understanding grammar for an automatic speech recognition (ASR) application program. The method may be practiced in relation to a computerized ontology that contains information about a plurality of hierarchically organized concepts related to a domain of the ASR application program. For each of at least a subset of the plurality of concepts, information is stored in association with the concept. The information includes at least one hint about how a human speaker might refer to the concept in an utterance.

The at least one hint may include a prelude and a postlude.

An embodiment of the present invention provides a computer program product for automatically generating a speech understanding grammar for an automatic speech recognition (ASR) application program. The computer program product includes a non-transitory computer-readable medium. The non-transitory computer-readable medium has computer readable program code stored on it. The computer readable program code is configured to access a computerized ontology. The ontology contains information about a plurality of hierarchically organized concepts related to a domain of the ASR application program. For each concept, of at least a subset of the plurality of concepts, the ontology includes at least one associated hint about how a human speaker might refer to the concept in an utterance. At least one user command is accept, via a user interface. The at least one user command identifies a user-selected subset of the plurality of concepts. At least one hint is associated with each concept of the user-selected subset of the plurality of concepts. A speech understanding grammar is generated from the retrieved at least one hint.

For at least one concept of the user-selected subset of the plurality of concepts, the computer readable program code may be configured to identify a second concept at a lower hierarchical level than the at least one concept. In addition, at least one second hint associated with the second concept may be retrieved from the ontology. The speech understanding grammar may be generated from the retrieved at least one hint by generating a speech understanding grammar from the retrieved at least one second hint.

The at least one hint may include a prelude and a postlude.

BRIEF DESCRIPTION OF THE DRAWINGS

The invention will be more fully understood by referring to the following Detailed Description of Specific Embodiments in conjunction with the Drawings, of which:

FIG. 7 is a portion of an exemplary hypothetical grammar skeleton, according to an embodiment of the present invention.

FIG. 8 is a portion of an exemplary hypothetical grammar skeleton of a lower-level portion of the skeleton of FIG. 7, according to an embodiment of the present invention.

DETAILED DESCRIPTION OF SPECIFIC EMBODIMENTS

Figure 1:
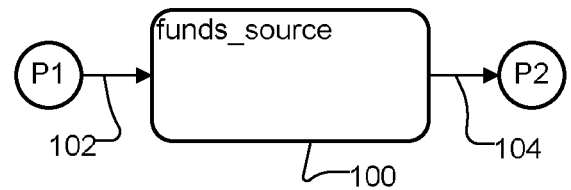
FIG. 1 is a schematic block diagram of an exemplary hypothetical concept and its associated preludes and postludes, as stored in an ontology, according to an embodiment of the present invention.

In accordance with embodiments of the present invention, methods and apparatus are disclosed for automatically generating a speech understanding grammar, i.e., a grammar used in an ASR system to interpret meanings of recognized words in a topic (domain), from an ontology that stores information about the domain. Such a grammar is a hybrid of a conventional grammar and a robust grammar. The hybrid grammar is similar in concept to a robust grammar that includes predefined filler words. The ontology is augmented with information sufficient to enable the automatic grammar generation.

In particular, the ontology is augmented with "preludes" and "postludes." A prelude is a word or phrase that precedes an object (specifically, an instance of a concept) in a user utterance, and a postlude follows the object in the utterance. User utterances include references to specific objects (instances) within predefined concepts. For example, a speech-enabled banking system may define an "account" concept, with possible instances "checking" and "savings." Preludes and postludes are used as hints to the ASR system for recognizing concepts within user utterances. For example, in the possible user utterance "Pay the Visa bill with money from my checking account," "with money from my" is a prelude that introduces "checking" as a source of funds, i.e., an "account" concept, and the utterance "account" is a postlude for the concept. Other possible preludes for the account concept include "from," "from my" and "use money from my." Another concept in this utterance is "payee," with instances that may include, for example, "Visa," "Discover," "American Express," "mortgage" and "car loan."

Bounding concepts within prelude-postlude pairs facilitates identifying instances of the concepts within user utterances, regardless of where the instances appear in the utterances. For example, the preludes and postlude described above enable the banking system to also recognize an account (here "checking") in "Use money from my checking account to pay the Visa bill."

The ontology includes a grammar for each concept and a grammar for each prelude and a grammar for each postlude. Once the grammars are defined, higher level concepts may be defined in terms of the (lower level) concepts, without rewriting the lower level concepts' grammars. For example, a "bill pay" concept may be defined in terms of the lower-level concepts "payee" and "account." Such a hierarchical arrangement of definitions may include an arbitrary number of levels.

A lower-level concept may appear in more than one upper-level concept, possibly with different preludes and/or postludes, to distinguish between different contexts. For example, in a "verify funds" transaction concept (exemplified by the utterance "Do I have enough money in my checking account to pay my Visa bill?"), the prelude for the account concept is "in my," whereas in the above-described "bill pay" concept, the prelude for the account concept is "from my." These and other aspects of the present invention are described in more detail below.

An ontology is a formal representation of knowledge as a set of concepts within a domain. The concepts may be hierarchically arranged. An ontology typically includes properties of, and relationships among, the concepts. Most ontologies describe concepts (classes), as well as objects (individual instances, each of which is a member of a specific class). For example, an ontology may contain information about a family of people (the domain). The ontology may define a class called "person," and it may contain assertions that "John," "Mary" and "Fred" are individual instances of the class "person." Other classes may include "man," "woman," "father," "mother" and "professor." It should be noted that an individual may belong to more than one class. As noted, classes may be organized in a hierarchy. Thus, "woman" may be a subclass of "person." Objects may have properties, such as relationships to other objects. For example, the individual "John" may be related to "Mary" by a "has_wife" relationship.

Embodiments of the present invention utilize ontologies to represent concepts in expected user utterances received by speech-enabled systems. For example, for generating a grammar for an electronic banking application, an ontology may include several concepts, including: "account" (with individual instances for "savings" and "checking"), "transaction_type" (with instances for "deposit," "withdrawal," "transfer" and "bill pay"), "payee" (with instances for "Visa," "telephone_service_provider" and "water_utility"), "amount," "date" and "time."

Concepts in the ontology are augmented with "hints" about how a human might talk about the objects. We refer to these hints as "gramlets." Gramlets contain words or phrases (collectively referred to herein as "phrases") that introduce, follow or surround an identification of the object in an utterance. We say an "identification" of the object, because the utterance may not necessarily explicitly name the object. For example, the utterance may refer to the object as "it" or "them." A phrase that introduces an identification of an object is called a prelude, and a phrase that follows an identification of the object is called a postlude. We use the term "lude" to refer to a prelude, a postlude or both.

For example, in an utterance intended to initiate a transaction to pay a bill or transfer funds, a human user may say, "Pay Visa $527 from my savings account," or "Use checking to pay the water bill." In these example utterances, the user indicates a source of funds with the phrase "from my savings account" or "use checking." In these examples, "from my" and "use" are preludes, and "account" is a postlude. Preludes and/or postludes can be used to infer the intent of an adjacent phrase. In this example, the preludes and/or postlude indicate the adjacent concept (here instantiated with "savings" or "checking") identifies a source of funds for the transaction.

Continuing the previous example, the ontology may include a "funds_source" concept (representing where money for a transaction comes from) and objects representing fund sources corresponding to the user's accounts (for example, "savings" and "checking"). In this case, the "funds_source" concept may be augmented with gramlets for "from my," "use" and "account."

Thus, as schematically illustrated in FIG. 1, the "funds_source" 100 concept is augmented with preludes P1 and postludes P2. The arrows 102 and 104 indicate time order. That is, during an utterance, a prelude P1 precedes the identification of the funds source, and the postlude P2 follows the identification of the funds source. That is, the user utters a prelude before uttering a phrase that identifies the funds source, and then the user utters the postlude.

Preludes and postludes are not necessarily independent. Some postludes may be appropriate only in the contexts of corresponding preludes, thereby forming prelude/postlude pairs.

The ontology can be constructed using any appropriate tool, such as the W3C OWL 2 Web Ontology Language (OWL) and the Protégé ontology editor. Similarly, the ontology may represent the preludes P1 and postludes P2 in any suitable way. In one embodiment, preludes and postludes for a concept are represented in the ontology by linked lists of elements. Each concept that has one or more associated ludes may include a list head pointing to the first element in the linked list. Each element points to the next element in the linked list, except the last element, which contains a null pointer. Each element of the list contains, or points to, a grammar of a prelude, a grammar of a postlude or both. Optionally or alternatively, each concept that has an associated lude may include a relationship, such as "has_prelude," "has_postlude" or "has_lude_pair," with its corresponding lude(s).

Collectively, the preludes and postludes ideally unambiguously encapsulate expressions representing their corresponding concepts in their respective specific contexts. Thus, the preludes and postludes for a concept should include all filler phrases, or at least a number of reasonably expected filler phrases, that a human user might use in relation to the concept.

In the previous example, the transaction is initiated with an instruction uttered by the user ("Pay Visa . . . " or " . . . pay the water bill"). A transaction can also be initiated by a question asked by the user. For example, a user may ask, "When is the Visa bill due?" or "By when do I have to pay my water bill?" Such a query identifies a payee (ex., "Visa" or "water_utility").

Figure 2:
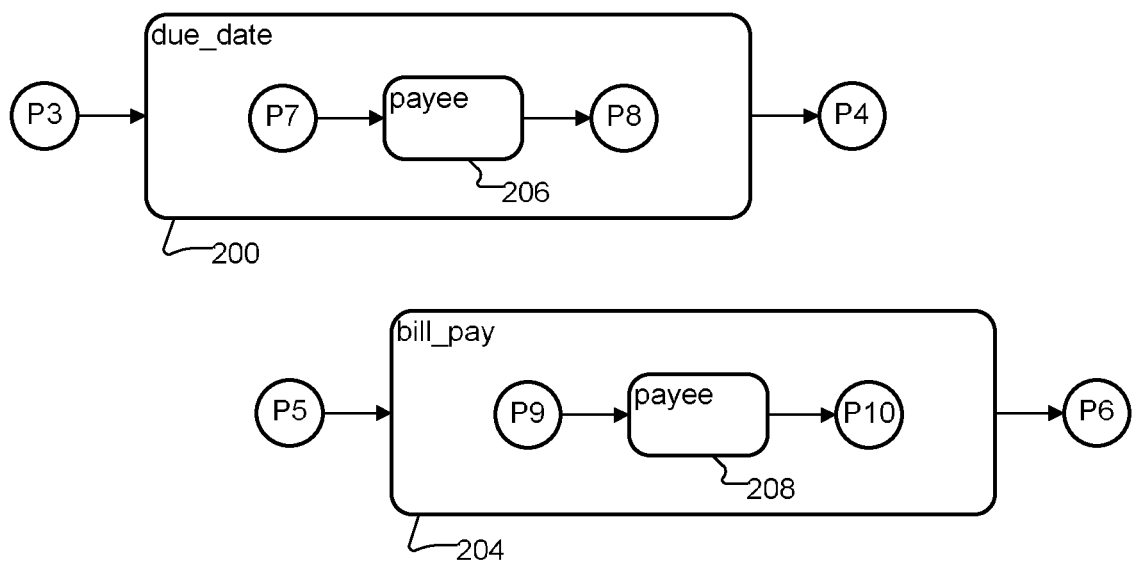
FIG. 2 is a schematic block diagram of two exemplary hypothetical concepts and their associated respective preludes and postludes, as stored in an ontology, according to an embodiment of the present invention.

However, the concept of a "payee" may also appear in another context, such as paying a bill ("Pay Visa $527 from my savings account.") As shown schematically in FIG. 2, to avoid ambiguity, the ontology may include separate concepts "due_date" 200 and "bill_pay" 204 corresponding to these two types of transactions. Each of these concepts 200 and 204 includes a "payee" subconcept ("constituent") 206 and 208, respectively, using the hierarchical structure of the ontology. Preludes P3 and postludes P4 for the "due_date" concept 200 are different than preludes P5 and postludes P6 for the "bill_pay" concept 204. Thus, whether a user utterance is (i) a query related to the due date or (ii) an instruction to pay a bill can be determined by the preludes P3 and P5 and the postludes P4 and P6.

An exemplary (although not necessarily complete) set of preludes P3 and postludes P4 for the "due_date" concept 200 is listed in Table 1. In the table, a vertical bar ("|") separates alternatives, i.e., the bar represents "or," and square brackets ("[ ]") enclose optional phrases. These gramlets are presented in Table 1 in Augmented Backus Normal Form (ABNF), and they may be stored in the ontology in ABNF. Alternatively, any suitable compact and unambiguous grammar specification may be used.

TABLE 1

Exemplary preludes and postludes for "due_date" concept

| N | Prelude | Postlude |
|---|---------|----------|
| 1 | ((when\|on what date) is\|when's) | due |
| 2 | (when\|on what date) (should\|must) (i\|we) pay | |
| 3 | (when\|on what date) do (i\|we) [(have\|need) to] pay | |
| 4 | (when\|on what date) is [the\|my] payment due (for\|to) | |
| 5 | (when\|on what date) does | (have\|need) to be paid |
| 6 | (when\|on what date) (should\|must) | be paid |
| 7 | (we\|i) (should\|(have\|need) to) pay | (when\|on what date) |
| 8 | when does | need [to receive] payment |

Note that some preludes (for example, the preludes on lines 1 and 5-8 of Table 1) have corresponding postludes, whereas other preludes (such as the preludes on lines 2-4) have no postludes. Some postludes (none shown in this example) have no preludes.

As noted, a different set of preludes P5 and postludes P6 augment the "bill_pay" concept 204 in the ontology. Table 2 lists an exemplary (although not necessarily complete) set of preludes P5 and postludes P6 for the "bill_pay" concept 204.

TABLE 2

Exemplary preludes and postludes for "bill_pay" concept

| N | Prelude | Postlude |
|---|---------|----------|
| 1 | [i (want\|need\|would like) to] pay | |
| 2 | make [a] payment to | |

The ontology also specifies constituents (subconcepts) of the bill_pay concept, i.e., AMOUNT and ACCOUNT, as well as DATE and PAYEE. These constituents have their own respective concept-specific prelude/postlude pairs (grammars), which are active inside the bill_pay concept. The bill_pay concept is selected when a user utterance matches its ludes P5 and P6 (FIG. 2).

The hierarchical nature of the (constituent) ontology is very useful, because at each level of the hierarchy, concepts have their own ludes. Thus, each level of the hierarchy need not be concerned with details of levels below it. For example, "pay $100 on my Visa bill" may be recognized as "pay AMOUNT on my PAYEE bill" from line 1 of Table 2. In this context, "pay" is a prelude of the pay_bill concept, and "my PAYEE bill" are the "ludes" for PAYEE ("my" is the prelude, and "bill" is the postlude). "On" is an optional postlude for AMOUNT.

The "payee" concept 206 in the "due_date" concept 200 may have its own preludes P7 and postludes P8. Table 3 lists an exemplary (although not necessarily complete) set of preludes P7 and postludes P8 for the "payee" concept, in the context of a "due_date" transaction. It should be noted that the optionality of "my" and "bill" (in line 1 of Table 3) allows recognition of the following utterances: "Visa bill" and "my Visa." The non-optionality of "the" and "bill" in the following prelude/postlude pair (in line 2 of Table 3) allows recognition of "the Visa bill," but not of "the Visa."

TABLE 3

Exemplary preludes and postludes for "payee" concept, in the context of a "due_date" transaction

| N | Prelude | Postlude |
|---|---------|----------|
| 1 | [my] | [bill] |
| 2 | the | bill |

Similarly, the "payee" concept 208 in the "bill_pay" concept 204 may have its own preludes P9 and postludes P10, which may be different than the preludes P7 and postludes P8 for the payee concept 206 in the "due_date" concept 200. Table 4 lists an exemplary (although not necessarily complete) set of preludes P9 and postludes P10 for the "payee" concept, in the context of a bill_pay transaction. In this case, the preludes and postludes for the payee concept in the due_date and in the bill_pay contexts are identical, i.e., Tables 3 and 4 are identical. However, in some cases, an example of which is described below, a concept may have different preludes and/or postludes in different contexts.

TABLE 4

Exemplary preludes and postludes for "payee" concept,
in the context of a "bill_pay" transaction

| N | Prelude | Postlude |
|---|---------|----------|
| 1 | [my]    | [bill]   |
| 2 | the     | bill     |

We use a compact notation to represent sentences a user may utter to initiate a transaction. The notation includes a name of the transaction, followed by the constituents of the sentence enclosed in parentheses and separated by commas. Each optional constituent is preceded by a question mark. Thus, the following notation represents the "due_date" sentences the system will recognize:

DueDate (PAYEE)

The following notation represents the "bill_pay" sentences the system will recognize:

BillPay (PAYEE, ?AMOUNT, ?ACCOUNT, ?DATE)

Information about sentences a user may utter is represented as a hierarchy of concepts in the ontology. For example, as shown schematically in FIG. 3, sentences a user may utter to invoke the "bill_pay" transaction include a "bill_pay" prelude (defined by P5), followed by one or more constituents (at least "payee" 208, and optionally "account" 300, "amount" 302, "date" 304 and/or "filler" 306), followed by a "bill_pay" postlude (defined by P6). Each of "payee" 208, "account" 300, "amount" 302 and "date" 304 has its own respective preludes P9, P13, P11 and P15 and postludes P10, P14, P12 and P16. Thus, the notations shown above can be derived by parsing the ontology.

A user may utter the constituents in any order. The order in which the constituents are listed in the notation does not imply or require an order in which they are to be uttered. The sentences listed in Table 5 represent examples of sentences that meet the requirements of the BillPay notation shown above.

TABLE 5

Exemplary "BillPay" sentences

I want to pay [AMOUNT on] [my PAYEE bill] [from ACCOUNT] [[on] DATE]
Make a payment to [PAYEE] [(for|of) AMOUNT]

Note that the notation is language independent. The notation defines the identity and optionality of its constituents, not the order of the constituents, nor the language or grammar of utterances that meet its requirements.

Figure 3:
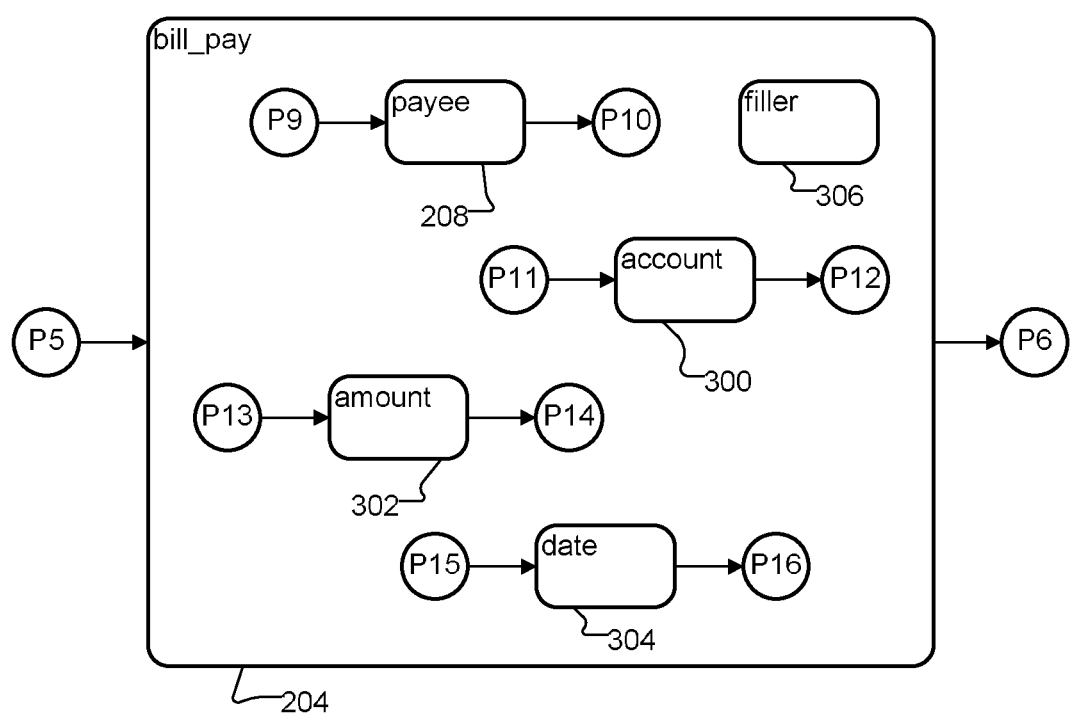
FIG. 3 is a schematic block diagram of an exemplary hypothetical hierarchy of concepts and their respective preludes and postludes, as stored in an ontology, according to an embodiment of the present invention.

FIG. 2 shows only one constituent ("payee") of the "bill_pay" concept 204. However, as just noted, the "bill_pay" concept involves additional concepts. FIG. 3 schematically illustrates the "bill_pay" concept 204 stored in the ontology with its constituents and their respective preludes and postludes. The fact that the constituents may be uttered in any order is indicated by lack of any arrows connecting the constituents to each other. Only elements that are connected by arrows need to be uttered in a prescribed order. Thus if, for example, the account 300 is to be uttered before the amount 302, an arrow (not shown) would extend from the account 300 postlude P12 to the prelude P13 of the amount 302.

Any concept may include one or more filler concepts, such as filler 306, to accommodate disfluencies, such as "um," "uh," "like" or "er." Other examples of fillers include "please" and "thanks." Such words or phrases may be uttered in the beginning, middle or end of a pay_bill expression, without participating in any of the constituent expressions.

Continuing the electronic banking application example of above, additional transactions may enable a user to: request a balance due to a payee, verify sufficient funds exist for a stated purpose and receive a response indicating whether a balance is overdue. Table 6 lists exemplary notations and exemplary utterances for these transactions.

TABLE 6

Additional exemplary transactions and utterances

Balance (PAYEE, ?DATE)
    What is the balance on [my PAYEE bill] [for DATE]
    How much is [my PAYEE bill]
VerifyFunds (PAYEE, ?ACCOUNT, ?AMOUNT, ?DATE)
    Do I have enough [in ACCOUNT] to pay [AMOUNT to] [PAYEE] [[on] DATE]
    Is there enough money for [the PAYEE bill] [in [my] ACCOUNT [account]]
OverDue (?PAYEE)
    Is [my ?PAYEE bill] over due
    Are there any overdue bills
BillPay (PAYEE, ?AMOUNT, ?ACCOUNT, ?DATE)
    I want to pay [AMOUNT on] [my PAYEE bill] [from ACCOUNT] [[on] DATE]
    Make a payment to [PAYEE] [(for | of)AMOUNT]

Figure 4:
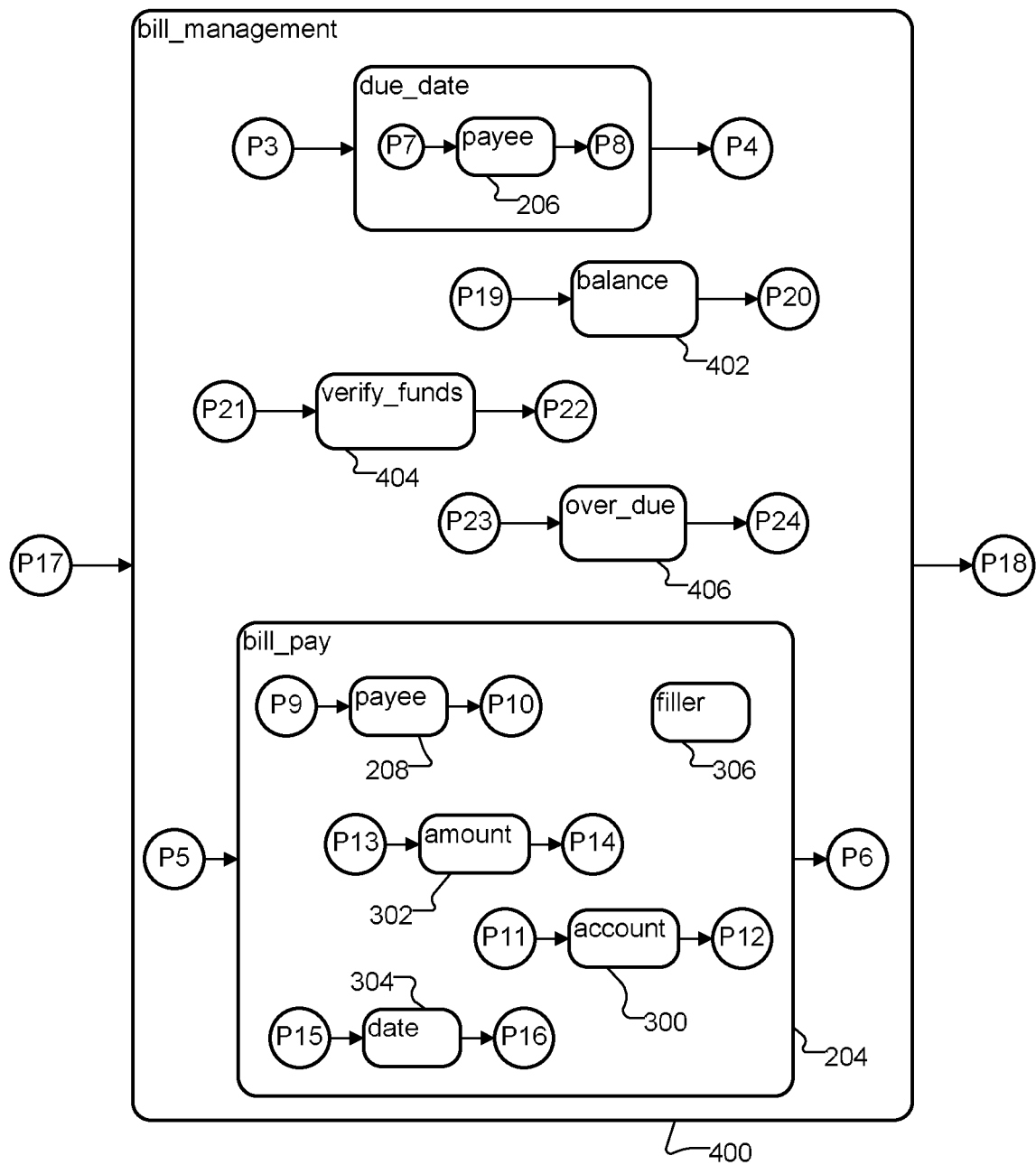
FIG. 4 is a schematic block diagram of another, more complex, exemplary hypothetical hierarchy of concepts and their respective preludes and postludes, as stored in an ontology, according to an embodiment of the present invention.

Each of these transactions has a corresponding concept, and each concept has its corresponding constituents and preludes and postludes, stored in the ontology in a form similar to that discussed above, with respect to FIG. 3. As schematically illustrated in FIG. 4, these concepts may be subconcepts of a yet higher level concept named "bill_management" 400 stored in the ontology. (For simplicity, not all constituents of the "balance" concept 402, "verify_funds" concept 404 and "over_due" concept 406 are shown in FIG. 4.) Thus, the "bill_management" concept 400 forms a root of a tree structure of concepts stored in the ontology. "Leaves" of the tree correspond to constituents. These leaves store conventional grammars, such as for payee 206 and 208. However, each of these grammars is configured to recognize its corresponding constituent in the context of its corresponding transaction. Thus, for example, the ludes P7/P8 are likely to be difference from P9/P10.

As noted, in this case, in the "due_date" context and in the "bill_pay" context, the preludes and postludes for the "payee" concept are identical, i.e., Tables 3 and 4 are identical. However, in some cases, a single concept may have different preludes and/or postludes in different contexts. For example, both the "bill_pay" 204 and the "verify_funds" 404 contexts include an optional "account" constituent. (See Table 6 and FIG. 4.) However, the preludes and/or postludes for the "account" constituent are different in these two contexts. In the "bill_pay" 204 context, preludes for the "account" concept may include "from [my]" and postludes may include "account," as in "I want to pay $100 on my Visa bill from my checking account." In the "verify_funds" 404 context, preludes for the "account" concept may include "in [my]," as in "Do I have enough in my checking account to pay $100 to Visa?"

As used herein, a "core" grammar includes grammars for all constituents and their respective preludes and postludes. For example, in FIG. 4, the core grammar for the "bill_pay" concept 204 includes grammars for the "payee," "amount," "account" and "date" concepts, their respective preludes and postludes P9-P16 and the filler.

Another, more subtle, example involves the "payee" concept. The preludes for the "payee" concept in the "bill_pay" 204 context may include "[my]" and the postludes may include "[bill]," as in "I want to pay $100 on my Visa bill from my checking account." On the other hand, the preludes for the "payee" concept in the "verify_funds" 404 context may include "(to pay|for) [my]," as in "Do I have enough {[in my (savings) account] [to pay my (Visa) bill?]}." Parenthesized phrases represent cores of ACCOUNT and PAYEE; square brackets delimit lude-augmented cores of these constituents; and curly braces delimit the core of VerifyFunds.

Storing grammars in such a hierarchical organization facilitates constructing and modifying the grammars, because a grammar developer can concentrate on configuring each grammar for a specific context, without being concerned about configuring a grammar that handles all the contexts represented in the ontology. Each level of the tree can be thought of representing a different level of abstraction of a speech-enabled application, with the root of the tree representing the most abstract concept. In the example of FIG. 4, the most abstract concept is a bill management system. FIG. 4 shows three levels of hierarchy; however, other numbers of levels may be used. An exemplary notation for a bill management transaction follows, in which square brackets indicate exactly one of the alternatives may be invoked:

BillManagement [DueDate, Balance, VerifyFunds, OverDue, PayBill]

Figure 5:
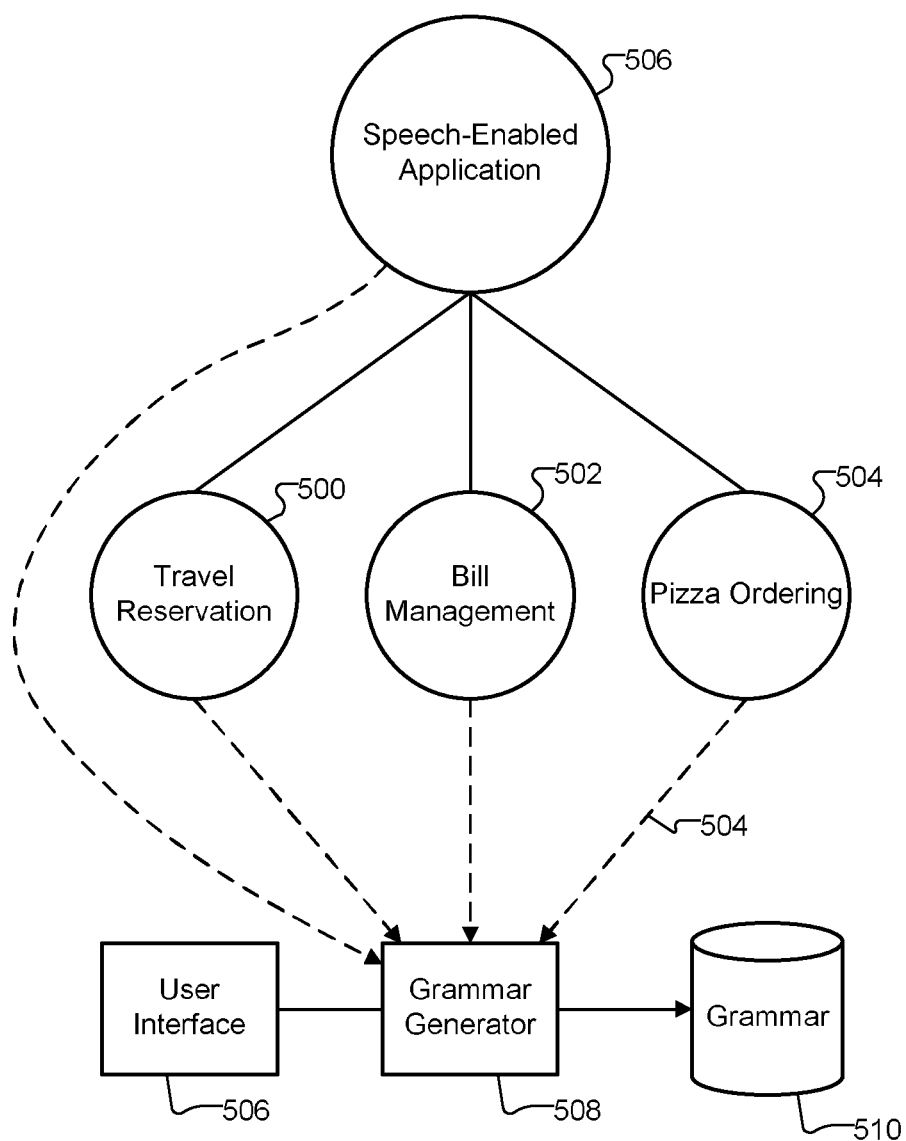
FIG. 5 is a schematic block diagram major components of an automatic grammar generator and their connections to an exemplary hypothetical hierarchy of concept trees, as stored in an ontology, according to an embodiment of the present invention.

Similar trees can be constructed for other domains, such as pizza ordering and travel reservation. Then, as schematically illustrated in FIG. 5, all these trees 500, 502 and 503 can be abstracted under a yet higher level of abstraction, such as a "speech_enabled_application" concept 506. The number of levels of abstraction is arbitrary. For example, the "bill_management" concept 400 (FIG. 4) can have more or fewer levels of abstraction than shown. In addition, each branch of the tree may have a different number of levels of abstraction.

In some cases, it may be beneficial or necessary to introduce a layer in the hierarchy that does not coincide with a layer of abstraction apparent to a user. We refer to such a layer as a "hidden concept." For example, to support an "ACCOUNT_SEARCH" transaction exemplified by sentences listed in Table 7, it may be necessary to include a hidden concept in the hierarchy.

TABLE 7

Exemplary "Account Search" sentences

Show me {[my (five) most recent] <[(savings) account] [(transactions)]>}
Show me {[the last (three)] <[(two hundred dollar)] [(deposits)]>}

Using our notation, "account search" sentences may be represented as shown in Table 8.

TABLE 8

Exemplary "Account Search" sentence notations

ACCOUNT_SEARCH<?NUMBER_OF_TRANSACTIONS, ACCOUNT_SEARCH_PRIMITIVE>
ACCOUNT_SEARCH_PRIMITIVE(TRANSACTION_OR_PAYEE, ?ACCOUNT, ?AMOUNT_RANGE, ?PAST_DATE_RANGE)
TRANSACTION_OR_PAYEE[PAYEE, TRANSACTION]
AMOUNT_RANGE(?MODIFIER, AMOUNT)

Where the angle brackets "< >" indicate that the constituents must appear in the specified order.

In this example, "ACCOUNT_SEARCH_PRIMITIVE" represents the hidden concept. "NUMBER_OF_TRANSACTIONS" is at the highest level to enable recognition of the sentences shown in Table 7. (Angle brackets delimit the scope of the "ACCOUNT_SEARCH_PRIMITIVE" concept.) "NUMBER_OF_TRANSACTIONS" is at the highest level to prevent recognition of the sentences listed in Table 9, which are syntactically illogical.

TABLE 9

Exemplary syntactically illogical "Account Search" sentences

Show me {[(savings) account] [... (five) ...] [(deposits)]}
Show me {[over (two hundred dollar)] [... (three) ...] [(transactions)]}

The sentences shown in Table 9 would, however, be recognized if the transaction were defined without the hidden concept in the hierarchy, for example as shown in Table 10.

TABLE 10

Exemplary imperfect "Account Search" sentence notations

ACCOUNT_SEARCH(COUNTED_T_OR_P, ?ACCOUNT, ?AMOUNT_RANGE, ?PAST_DUE_RANGE)
COUNTED_T_OR_P(?NUMBER_OF_TRANSACTIONS, TRANSACTION_OR_PAYEE)

Figure 6:
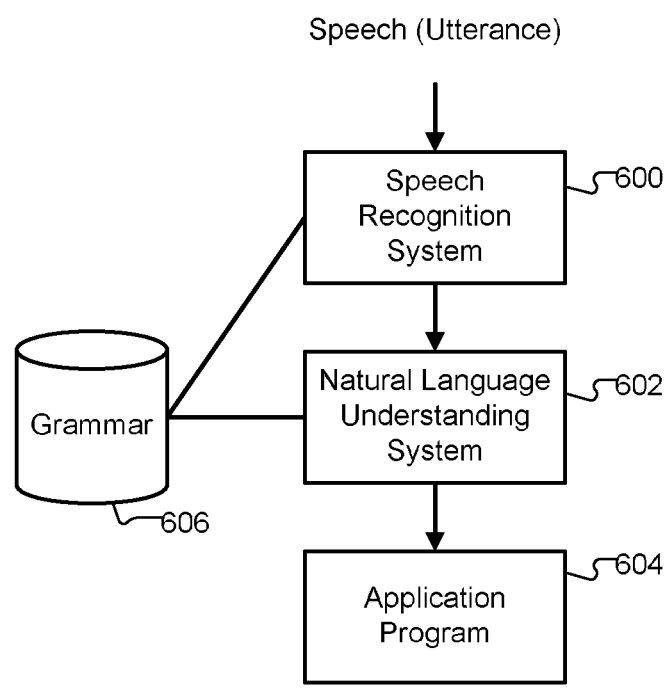
FIG. 6 is a schematic block diagram of stages of a typical speech-enabled system, according to the prior art.

As previously noted, a typical natural language understanding speech-enabled system processes user utterances in several stages, as shown schematically in FIG. 6. First, a speech recognition system 600 attempts to recognize individual words in an utterance or statistically possible words in the utterance. That is, the speech recognizer 600 converts an audio input into a string of words or possible words. Then, a natural language understanding system 602 attempts to interpret the recognized words or possible words to ascertain (infer) a meaning of the utterance. The interpreted words are then passed to an application program 604, which implements business or control logic to transfer funds, control a device, etc., according to the inferred meaning of the utterance. The natural language understanding system 602, and optionally the speech recognition system 600, use a grammar 606. It is common for speech recognition systems to use statistical grammars (language models). However, in the absence of sufficient targeted data, systems that use these models may not perform well. Consequently, it is often necessary to build grammars for applications, for which sufficient data is not yet available and, as noted, grammars are difficult to build, particularly for complex domains.

An ontology augmented as described herein may be used to automatically generate the grammar 606. Returning to FIG. 5, a user interface 506 displays concepts in the trees 500-506 of the ontology. Using the user interface 506, a developer selects concepts within the ontology, where the selected concepts represent transactions an application program is to handle, and a grammar generator 508 then automatically generates a grammar 510 by concatenating the grammars of all the leaf nodes under the selected concepts, as discussed below.

For example, assume a user selects the Bill Management tree 502 and all its concepts for automatic grammar generation. (As noted, the user could alternatively have selected a subset of the concepts under the Bill Management tree 502.)

An exemplary automatically generated grammar skeleton for the bill_management concept (FIG. 4) is shown in FIG. 7. The grammar skeleton of FIG. 7 is specified according to the Speech Recognition Grammar Specification (GRXML) standard maintained by the World Wide Web Consortium (W3C). The syntax used in FIG. 7 is based on the Extensible Markup Language (XML); however, another syntax based on ABNF, or another specification standard, may be used.

The first line 700 defines a rule named "BillManagement," which invokes exactly one of several rules 702. The rules 702 include rule groups 704, 706, 708, 710 and 712 corresponding to the DueDate, Balance, VerifyFunds, OverDue and PayBill transactions, respectively, i.e. the concepts selected by the user for automatic grammar generation. Each rule group 704-712 includes one or more rules. Each rule 702 may be automatically generated from information stored in: (a) the respective user-selected concepts, (b) any concept between the upper-most concept in the hierarchy and the user-selected concepts and (c) sub-concepts of the user-selected concepts.

Each rule includes a reference to a core grammar. For example, each rule in rule group 704 refers to a grammar for due_date ("<ruleref uri="# DueDate">"). The grammar may be stored in the ontology or, as shown in FIG. 7, the grammar may be stored in a separate file and a reference (here a uniform resource identifier (URI)) to the file may be stored in the ontology. Each core grammar is instantiated once for each prelude/postlude definition.

Each rule includes a reference to its corresponding prelude and/or postlude. Although not necessary for functionality, but for ease of identification, references to the preludes and postludes in FIG. 7 begin with one or two characters ("DD," "B," "VF," "OD" and "PB") that are mnemonic for the name of the corresponding transaction, as exemplified by "DD" 714 for "due date."

For each rule group 704, 706, 708, 710 and 712, the grammar rules are automatically generated from corresponding concepts in the ontology. For example, within rule group 704, each rule corresponds to a prelude-postlude pair from the "due_date" concept stored in the ontology, as discussed above with respect to FIG. 2. As discussed above, Table 1 lists prelude-postlude pairs stored in the ontology. The number "N" in each row of Table 1 is appended to "DDPrelude" and "DDPostlude" to generate GRXML comments, such as "<!--DDPrelude1-->" and "<!--DDPostlude2-->," in each rule in rule group 704. These comments serve as placeholders for the prelude/postlude pairs. For example, <!--DDPrelude1--> is replaced by DueDate's first prelude, etc. (Other naming conventions can, of course, be used.) Consequently, rule group 704 has as many rules as there are rows in Table 1. The rules in rule group 704 differ from each other according to the prelude/postlude pair (from Table 1). Thus, for example, Table 1 yields the ABNF grammar shown in Table**.

TABLE 11

Exemplary "Due Date" grammar (
((when | on what date) is | when's) $DueDate due |
(when | on what date) (should | must) (I | we) pay $DueDate |
    (when | on what date) do (I | we) [(have | need) to] pay $DueDate
|
    (when | on what date) does $DueDate (have |need) to be paid
)

Because DueDate has only one constituent, namely PAYEE, the DueDate rule (referred to above as $DueDate) consists of a payee prelude, a payee body and a payee postlude.

Each rule in rule group 704 refers to a DueDate rule 718, which is generated in a later stage, as described below.

Each concept aggregates contents returned by constituents of the concept. For example, if a user utters, "I want to pay my Visa bill on March 1," and "March 1" is parsed as a "date" constituent 304 (FIG. 3), the "date" grammar returns a logical form, such as "DATE=MAR01," of the recognized date to its superconcept ("bill_pay" in this case). At the lowest level of the hierarchy, <ruleref uri="# PAYEE"> would return, for example, "PAYEE="Visa"" as its "contents." Similarly, <ruleref uri="# VerifyFunds"> would return, for example, "{PAYEE="Visa", ACCOUNT="checking"}," which it would have constructed from its constituents-contents. Thus, each constituent aggregates contents returned by its constituents, etc., down to leaves of the hierarchical tree.

"Semantic attachments" are mechanisms for delivering contents from a concept up the hierarchy to its superconcept. Semantic attachments may be represented by elided <tag> contents, such as "<tag> . . . </tag>" 720, and are generated from concept-contents from each of the constituents. An exemplary semantic attachment for the OverDue concept (rule group 710) is:

<tag> if (OverDue.PAYEE) PAYEE=OverDue.PAYEE
       </tag>

The preceding "if" statement is processed at the bill_management 400 level. PAYEE is a constituent of the OverDue 406 concept, i.e., PAYEE is a subconcept of OverDue, hence it is referred to as "OverDue.PAYEE." According to the "if" statement, if PAYEE is defined in the OverDue 406 concept, i.e., if a user utterance within the OverDue concept was recognized for the PAYEE subconcept, then PAYEE at the current level, i.e., at the bill_management 400 level, takes on the value of OverDue.PAYEE, i.e., the recognition of the user utterance within the OverDue concept. Statements, such as the "if" statement, are used to bring recognized contents from a lower level in the hierarchy to a higher level in the hierarchy.

Progressing down one level in the hierarchy of the ontology, a grammar rule "DueDate" may be automatically generated from the prelude/postlude pairs of Table 3, yielding a rule exemplified in FIG. 8. Here, the semantic attachment 800 may be replaced by:

<tag> if (PAYEE.PAYEE) PAYEE=PAYEE.PAYEE
       </tag>

In the preceding "if" statement, "PAYEE.PAYEE" refers to PAYEE in the lowest level of the hierarchy. This statement causes PAYEE at the current level of the hierarchy to take on the value of PAYEE at the lowest level of the hierarchy.

Rules for progressively lower levels in the hierarchy are similarly automatically generated. As noted, grammars, such as for preludes and postludes, are typically stored in the ontology. However, these and the lowest level objects in the ontology may have grammars that are stored outside the ontology, such as in a separate file. In such a case, the ontology stores a pointer, such as a URI, to the external grammar. We refer to grammars that are stored outside the ontology as "predefined grammars."

Table 12 lists three exemplary types of concepts that may be stored in the ontology. "Date" is an example of a low-level concept whose grammar is stored external to the ontology. It may be somewhat difficult to construct expressions for dates and their logical forms, so once such a grammar has been constructed, it may be preferable to save the grammar externally, making it available to more than one ontology. An example of a low-level concept with itemizations is an enumeration, such as an enumeration of months of the year. In another example, PAYEE may be constructed as a list of payees supported by the application or as a reference to a dynamic grammar. High-level concepts may contain: mnemonics for names of corresponding transactions (such as "DD" for due date); lists of constituents; lude pairs for the constituents; and flags indicating optionality and/or sequencing (order) of the constituents. Although three types of concepts are described, a suitable ontology may be constructed using more, fewer and/or other types of concepts.

TABLE 12

Exemplary concept types

Figure 9:
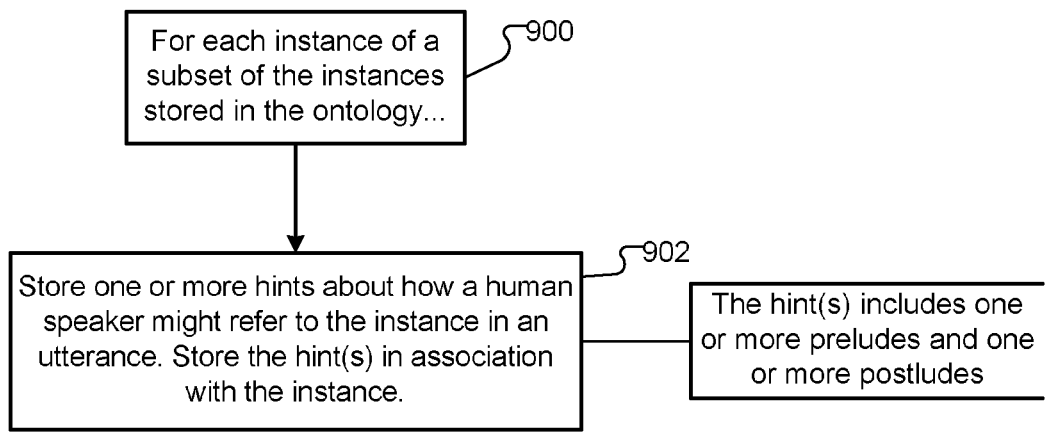
FIG. 9 is a flowchart that schematically illustrates operations of a method for constructing an ontology that can subsequently facilitate automatically generating a speech understanding grammar for an automatic speech recognition (ASR) application program, according to an embodiment of the present invention.

1 Low-level concepts with references, i.e. pointers, to grammars stored external to the ontology
2 Low-level concepts with itemizations stored in the ontology and that define grammars
3 High-level concepts made up of one or more lower-level concepts FIG. 9 is a flowchart that schematically illustrates operations of a method for constructing an ontology that can subsequently facilitate automatically generating a speech understanding grammar for an automatic speech recognition (ASR) application program. The ontology contains information about a number of hierarchically organized concepts related to a domain of the ASR application program, as well as information about a number of instances of at least a subset of the hierarchically organized concepts. At 900, for each of at least a subset of the concepts, the method involves storing 902 one or more hints about how a human speaker might refer to the instance in an utterance. The hint(s) are stored in association with the concept. As described above, the hint(s) may include one or more preludes and one or more postludes.

Figure 10:
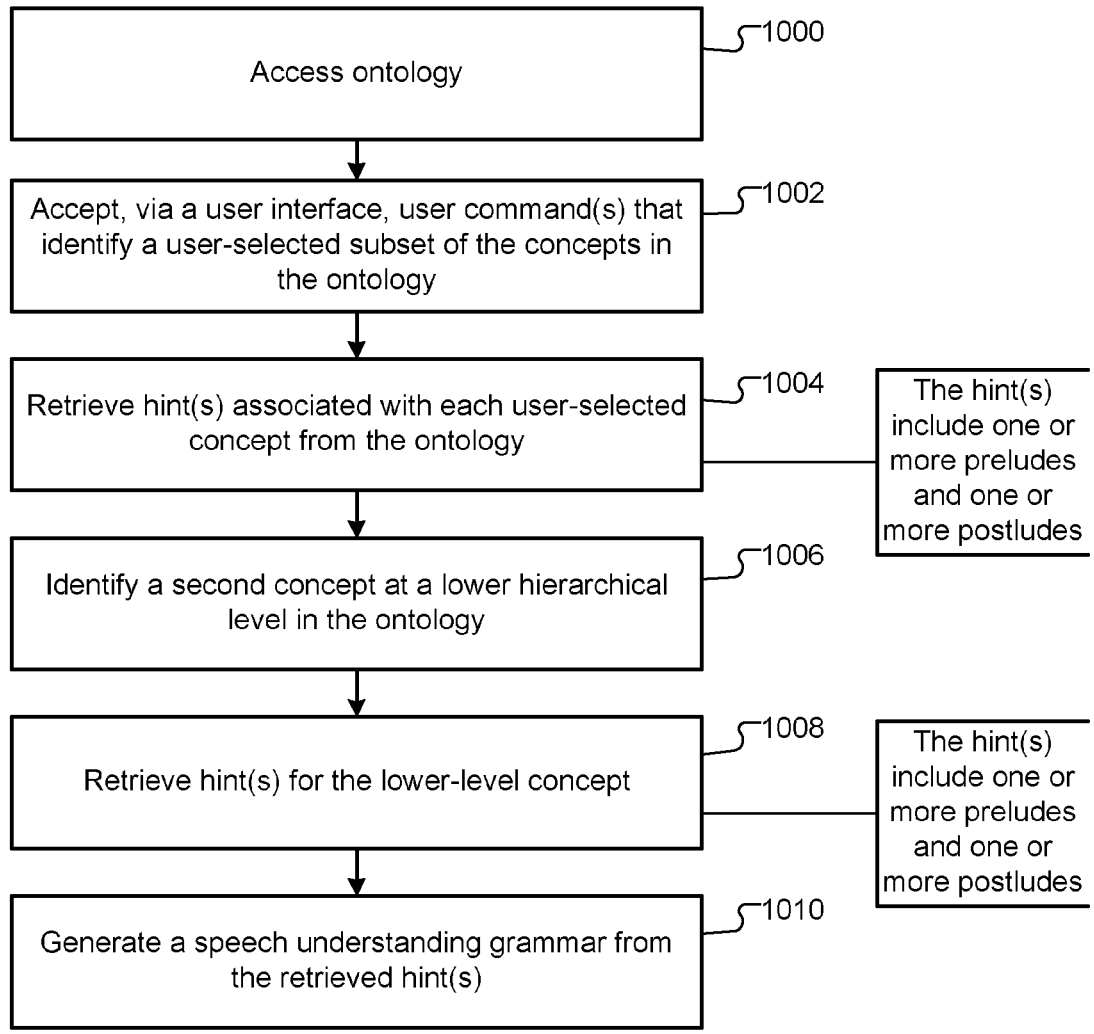
FIG. 10 is a flowchart that schematically illustrates operations of a method for automatically generating a speech understanding grammar for an automatic speech recognition (ASR) application program, according to an embodiment of the present invention.

FIG. 10 is a flowchart that schematically illustrates operations of a method for automatically generating a speech understanding grammar for an automatic speech recognition (ASR) application program. The method may be performed by a processor performing the following operations, including accessing an ontology 1000, according to instructions stored in a memory. The ontology contains information about hierarchically organized concepts related to a domain of the ASR application program. The ontology may also contain information about instances of at least a subset of the concepts. For each of these concepts, the ontology contains at least one associated hint about how a human speaker might refer to the concept in an utterance. At 1002, one or more user commands are accepted via user interface. The user command(s) identify a subset of the concepts in the ontology. This subset represents the types of transactions the ASR application program is to be able to recognize. At 1004, hint(s) associated with the user-selected concepts are retrieved from the ontology. The hints may be preludes and/or postludes. At 1006, concepts at a lower level in the hierarchy of the ontology are identified, and at 1008 hint(s) for these lower-level concepts are retrieved. Operations 1006 and 1008 can be repeated as many times as necessary to reach "leaf" nodes of the ontology hierarchy. At 1010, a speech understanding grammar is generated from the retrieved hint(s), such as by concatenating the retrieved hints.

Although an ontology that stores gramlets and grammars has been described, in some embodiments, the ontology instead stores pointers to gramlets and/or grammars that are stored in separate files or elsewhere. These pointers may, for example, be in the form of uniform resource identifiers (URIs). In such cases, the methods described herein follow the pointers to fetch associated gramlets and/or grammars.

Although embodiments have been described as using an ontology to store information to enable automatic grammar generation, another suitable data storage scheme may be used instead of, or in addition to, an ontology. For example, a resource description framework (RDF), an information model or a relational database (RDB) may be used.

Although aspects of embodiments may have been described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable non-transitory storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, the system may be embodied using a variety of data structures.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

What is claimed is:

1. A method comprising:
 receiving, by a computing device, an audio input based on an utterance by a user, wherein the audio input is received through an automatic speech recognition (ASR) application;
 converting, by the computing device, the audio input into a string of words;
 determining, by the computing device, a concept from the string of words by:
  querying a predefined ontology for one or more ludes that comprise at least one word of the string of words, wherein the predefined ontology describes a plurality of hierarchically organized concepts related to a domain of the ASR application, and wherein the predefined ontology stores instance information comprising respective one or more ludes corresponding to each of the plurality of hierarchically organized concepts;

determining that one of the respective one or more ludes comprises at least one word of the string of words, wherein the one of the respective one or more ludes corresponds to the concept; and identifying a prelude-postlude pair for the respective one or more ludes comprising the at least one word of the string of words;

generating, by the computing device and based on the predefined ontology, a speech understanding grammar associated with the concept by:

receiving a user selection of the concept determined from the string of words;

generating a grammar skeleton with one or more rule groups, wherein each rule group includes one or more rules with one or more placeholders for a prelude-postlude pair; and automatically populating at least one placeholder of the one or more placeholders of the one or more rules with the identified prelude-postlude pair from the predefined ontology for the respective one or more ludes comprising the at least one word of the string of words;

sending, by the computing device, the speech understanding grammar to the ASR application.

2. The method of claim 1, wherein the sub-concept is associated with a semantic attachment that is configured to identify the super-concept.

3. The method of claim 1, wherein each lude comprises the prelude and the postlude.

4. The method of claim 3, wherein the prelude and the postlude pair are associated with a time order.

5. The method of claim 4, further comprising:
determining a first word from the string of words that is bound by the prelude and the postlude; and
determining the concept based on the first word.

6. The method of claim 5 further comprising:
determining, by the computing device and based on the concept, external grammars stored in an external computerized database;
generating, by the computing device, a pointer to the external grammars; and
sending, by the computing device, the pointer to the ASR application.

7. The method of claim 1, wherein the querying the predefined ontology further comprises:
comparing the instance information to at least one word from the string of words.

8. The method of claim 7, further comprising:
determining the concept based on determining that the instance information is configured to identify the concept.

9. The method of claim 1 further comprising:
determining, by the computing device and based on the plurality of hierarchically organized concepts, external grammars stored in an external computerized database;
generating, by the computing device, a pointer to the external grammars; and
sending, by the computing device, the pointer to the ASR application.

10. The method of claim 1, further comprising retrieving, from the predefined ontology, a first hint and a second hint, wherein the first and second hints relate to the concept, wherein the generating comprises concatenating the retrieved first and second hints, and wherein at least one of the first and second hints is used to determine one or more of the sub-concept or the super-concept.

11. The method of claim 10, wherein the first hint and second hints comprise the prelude or the postlude.

12. A method comprising:
receiving, by a computing device, an audio input associated with a user utterance;
converting, by the computing device, the audio input into a string of words;
performing, by the computing device, natural language processing on the string of words by:
comparing at least one word from the string of words to a prelude and a postlude, wherein the prelude and the postlude are a pair configured to determine one or more concepts from a predefined ontology, wherein the prelude is a phrase introducing identification of an instance of the concept and the postlude is a phrase that follows an identification of the instance of the concept;
determining a plurality of grammars associated with the plurality of prelude and postlude pairs by:
causing display of the one or more concepts based on determining that the at least one word corresponds to the prelude or the postlude pair;
receiving a user selection of a concept;
in response to the receiving the user selection, determining, at least one of a sub-concept and a super-concept corresponding to the concept, wherein the at least one of the sub-concept and the super-concept have a hierarchical relationship to the concept;
determining, based on the concept and the at least one of the sub-concept and the super-concept, a plurality of preludes and postludes, wherein each of the plurality of prelude and postlude are pairs configured to identify one of the concept and the at least one of the sub-concept and the super-concept; and
generating a grammar skeleton with one or more rule groups, wherein each rule group includes one or more rules with one or more placeholders for a prelude and postlude pair; and
automatically populating at least one placeholder of the one or more placeholders of the one or more rules with the prelude and postlude pair from the concept of the predefined ontology and the at least one of the sub-concept and the super-concept; and
transmitting, by the computing device, the plurality of grammars to an application program of a user device.

13. The method of claim 12, wherein the at least one of the sub-concept and super-concept and the concept are part of a hierarchically organized group of concepts stored in a computerized database.

14. The method of claim 12, wherein the determining the super-concept is based on determining a semantic attachment associated with the sub-concept, and wherein the semantic attachment is configured to identify the super-concept.

15. The method of claim 12, further comprising:
determining, by the computing device and based on at least one of the sub-concept, the concept and the super-concept, external grammars stored in an external computerized database;
generating, by the computing device, a pointer to the external grammars; and
transmitting, by the computing device, the pointer to the application program of the user device.

16. A method comprising:
receiving, by a computing device, an audio input associated with a user utterance;
converting, by the computing device, the audio input into a string of words;
performing, by the computing device, natural language processing on the string of words comprising:
  determining that the string of words comprises a stored prelude and postlude pair of a predefined ontology based on comparing each word from the string of words to the stored prelude and postlude pair of the predefined ontology, wherein the prelude is a phrase introducing identification of an instance of the concept and the postlude is a phrase that follows an identification of the instance of the concept;
  determining, based on the stored prelude and postlude pair, a concept;
  determining, based on the stored prelude and postlude pair, a rule configured to parse at least one word from the string of words as a sub-concept;
  determining, based on the rule, the sub-concept;
  determining a super-concept associated with the concept and the sub-concept;
determining a plurality of grammars by:
  receiving a user selection of the concept;
  generating a grammar skeleton with one or more rule groups, wherein each rule group includes one or more rules with one or more placeholders for a prelude and postlude pair, wherein each rule refers to at least one of the concept, the sub-concept, the super-concept, and the stored prelude and postlude pair; and
  automatically populating at least one placeholder of the one or more placeholders of the one or more rules with the stored prelude and postlude pair of the predefined ontology based upon, at least in part, the user selection of the concept; and
transmitting, by the computing device, the plurality of grammars to an application program of a user device.

17. The method of claim 16, wherein the sub-concept, the concept and the super-concept are part of a hierarchically organized group of concepts stored in a computerized database.

18. The method of claim 17, wherein the determining the plurality of grammars is further based on determining one or more preludes and postludes for each of the hierarchically organized group of concepts.

19. The method of claim 16, wherein the determining the super-concept is based on determining a semantic attachment associated with the sub-concept, wherein the semantic attachment is configured to identify the super-concept.

20. The method of claim 16, further comprising:
determining, by the computing device and based on at least one of the sub-concept, the concept and the super-concept, external grammars stored in an external computerized database;
generating, by the computing device, a pointer to the external grammars; and
transmitting, by the computing device, the pointer to the application program of the user device.

21. The method of claim 16, wherein the determining the concept further comprises:
wherein the stored prelude and postlude pair are associated with a time order; and
identifying, by the computing device, a first word from the string of words, that is bound by the stored prelude and postlude pair.

* * * * *